(12) United States Patent
Masuda

(10) Patent No.: US 11,190,081 B2
(45) Date of Patent: Nov. 30, 2021

(54) ELECTRIC LINEAR MOTION ACTUATOR

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 484 days.

(21) Appl. No.: 16/185,894

(22) Filed: Nov. 9, 2018

(65) Prior Publication Data
US 2019/0097493 A1 Mar. 28, 2019

Related U.S. Application Data

(63) Continuation of application No. PCT/JP2017/017790, filed on May 11, 2017.

(30) Foreign Application Priority Data

May 19, 2016 (JP) .............................. JP2016-100177

(51) Int. Cl.
*H02K 21/24* (2006.01)
*H02K 7/06* (2006.01)
(Continued)

(52) U.S. Cl.
CPC .............. *H02K 7/06* (2013.01); *B60T 13/74* (2013.01); *B60T 13/741* (2013.01); *F16D 65/18* (2013.01);
(Continued)

(58) Field of Classification Search
CPC .......... B60T 13/74; F16D 65/18; H02K 1/18; H02K 1/27; H02K 21/24; H02K 7/102; H02K 7/06; H02K 3/28
See application file for complete search history.

(56) References Cited

U.S. PATENT DOCUMENTS 6,158,558 A * 12/2000 Bill .................... F16D 65/18
188/162
6,554,109 B1 4/2003 Olschewski et al.
(Continued)

FOREIGN PATENT DOCUMENTS

CN 1308786 8/2001
CN 1637573 7/2005
(Continued)

OTHER PUBLICATIONS

Chinese Office Action dated Jun. 23, 2020, in corresponding Chinese Patent Application No. 201780030019.2.
(Continued)

*Primary Examiner* — Tran N Nguyen
*Assistant Examiner* — Leda T Pham

(57) ABSTRACT

The electric linear motion actuator includes an electric motor, a linear motion mechanism configured to convert rotary motion of the electric motor to linear motion of a linear motion part via a rotation input-output shaft, and a housing holding the linear motion mechanism. The electric motor includes a stator and a rotor which are arranged such that the directions of magnetic poles that generate interlinkage flux contributing to a motor torque are parallel with a rotation axis of the electric motor. The stator is arranged so as to be coupled with an axial end surface of the housing. The rotor is arranged so as to have a space, in the axial direction, from the torque generating surface of the stator, and the rotor is fixed to the rotation input-output shaft of the linear motion mechanism.

7 Claims, 4 Drawing Sheets

(51) Int. Cl.
  *F16D 65/18*   (2006.01)
  *B60T 13/74*   (2006.01)
  *F16H 25/20*   (2006.01)
  *H02K 1/18*    (2006.01)
  *H02K 1/27*    (2006.01)
  *H02K 7/102*   (2006.01)

(52) U.S. Cl.
  CPC ............. *F16H 25/20* (2013.01); *H02K 1/182* (2013.01); *H02K 1/2793* (2013.01); *H02K 7/1025* (2013.01); *H02K 21/24* (2013.01)

(56) References Cited

U.S. PATENT DOCUMENTS

| | | |
|---|---|---|
| 7,148,592 B2 | 12/2006 | Miyawaki |
| 7,810,616 B2 | 10/2010 | Nakazeki |
| 7,821,169 B2 | 10/2010 | Okazaki et al. |
| 8,376,094 B2 | 2/2013 | Yamasaki et al. |
| 9,145,940 B2 | 9/2015 | Muramatsu et al. |
| 9,812,937 B2* | 11/2017 | Chen .................... H02K 1/2793 |
| 2005/0146233 A1 | 7/2005 | Miyawaki |
| 2008/0110704 A1* | 5/2008 | Nakazeki ................ F16D 65/18 188/158 |
| 2008/0136282 A1 | 6/2008 | Okazaki et al. |
| 2009/0101424 A1* | 4/2009 | Suzuki ..................... H02K 7/16 180/65.51 |
| 2010/0084230 A1 | 4/2010 | Yamasaki et al. |
| 2012/0146445 A1* | 6/2012 | Tokoi ................... H02K 21/026 310/156.37 |
| 2013/0048443 A1 | 2/2013 | Muramatsu et al. |
| 2014/0070656 A1* | 3/2014 | Ballena .................... H02K 3/47 310/208 |

FOREIGN PATENT DOCUMENTS

| | | |
|---|---|---|
| CN | 101103215 | 1/2008 |
| CN | 101675271 | 3/2010 |
| CN | 101103215 | 12/2010 |
| CN | 1637573 | 6/2011 |
| CN | 203368271 | 12/2013 |
| CN | 102893048 | 10/2016 |
| EP | 2803865 A1 | 11/2014 |
| JP | 2003-247576 | 9/2003 |
| JP | 2008-172884 | 7/2008 |
| JP | 2010-172094 | 8/2010 |
| JP | 2010-270788 | 12/2010 |
| JP | 2013-130088 A | 7/2013 |
| JP | 2013-221531 | 10/2013 |
| WO | WO 00/02302 A1 | 1/2000 |
| WO | WO2006/068042 A1 | 6/2006 |

OTHER PUBLICATIONS

International Preliminary Report on Patentability dated Nov. 29, 2018 in corresponding International Patent Application No. PCT/JP2017/017790.
Extended European Search Report dated Jan. 13, 2020 in European Patent Application No. 17799252.6 (7 pages).
Notice of Reasons for Refusal dated Feb. 18, 2020 in Japanese Patent Application No. 2016-100177 (3 pages) (3 pages English Translation).
Chinese Office Action dated Aug. 28, 2019 in corresponding Chinese Patent Application No. 201780030019.2.
International Search Report dated Aug. 15, 2017 in corresponding International Application PCT/JP2017/017790.
Chinese Office Action dated Mar. 5, 2021, in Chinese Patent Application No. 201780030019.2 (15 pages including translation).

* cited by examiner

ELECTRIC LINEAR MOTION ACTUATOR

CROSS REFERENCE TO THE RELATED APPLICATION

This application is a continuation application, under 35 U.S.C. § 111(a), of international application No. PCT/JP2017/017790, filed May 11, 2017, which is based on and claims Convention priority to Japanese patent application No. 2016-100177, filed May 19, 2016, the entire disclosure of which is herein incorporated by reference as a part of this application.

BACKGROUND OF THE INVENTION

Field of the Invention

The present invention relates to an electric linear motion actuator applicable to an electric brake device, for example.

Description of Related Art

As an electric actuator and an electric motor, the following documents suggest:
1. an electric disk brake device in which, on the outer circumference of a linear motion part, an electric motor is arranged coaxially with the linear motion part (Patent Document 1);
2. an electric brake device in which an electric motor is arranged on an axis different from the rotation axis of a linear motion mechanism so as to be parallel with the rotation axis (Patent Document 2); and
3. a double-stator axial gap motor having eight poles and nine slots (Patent Document 3).

RELATED DOCUMENT

Patent Document

[Patent Document 1] JP Laid-open Patent Publication No. 2003-247576
[Patent Document 2] JP Laid-open Patent Publication No. 2010-270788
[Patent Document 3] JP Laid-open Patent Publication No. 2008-172884

SUMMARY OF THE INVENTION

In general, in such an electric brake device using an electric linear motion actuator such as that described in Patent Document 1 or 2, an installation space therefor in a vehicle is extremely limited. The function of the electric brake device needs to be implemented in a space as small as possible. For example, in wheel speed control or the like, which is representatively exemplified as an antilock brake system (abbreviated as ABS), high-speed and high-precise control of a braking force is required for an electric brake.

For example, in a structure in which an electric motor is arranged on the outer circumference of an actuator as in Patent Document 1, the rotor diameter of the electric motor is increased, and thus, the moment of inertia is increased so that the responsiveness and the control accuracy may be deteriorated. Meanwhile, since kinetic energy required to rotate a rotor is proportional to the moment of inertia, instantaneous maximum power consumption to implement a high-speed response may be increased, and thus the cost of a power supply device for supplying power thereto may be increased.

For example, in an electric disk brake device, the temperature of an object, such as a friction pad, to be pressed by an actuator becomes extremely high. In this case, since an electric motor is close to a heat source, the durability may become a problem. In a case where an electric motor and an actuator are arranged in the common housing as in Patent Document 1, wires of the electric motor need to be arranged so as to avoid the actuator supporting structure. This may complicate the structure.

For example, in a case where an electric motor and a linear motion actuator are arranged in parallel with each other as in Patent Document 2, the electric motor and the linear motion actuator generally each have an outer appearance of a cylindrical shape in most cases, and the two cylinders are arranged adjacent to each other. This may generate a certain amount of dead space in a gap therebetween. Further, a coupling mechanism such as a parallel gear is needed between the electric motor and the linear motion actuator, irrespective of required specifications, resulting in a possible increase in the cost. In addition, respective support structures are needed for the electric motor and the linear motion actuator, so that problems relating to space and cost may arise.

As a motor structure for achieving high torque while saving space, an axial gap synchronous motor such as that disclosed in Patent Document 3 has been known, for example. In general, however, an axial gap motor is likely to generate a large thrust force in the rotation axial direction due to a gap imbalance between a rotor and a stator, an imbalance in a magnetic circuit, or the like. For this reason, a support structure against the thrust force becomes complicated, so that the cost may be increased.

An object of the present invention is to provide an electric linear motion actuator in which space saving and high torque can be achieved and the cost of which can be reduced with a simple structure.

An electric linear motion actuator according to the present invention includes:
an electric motor;
a linear motion mechanism having a rotation input-output shaft and being configured to convert rotary motion of the electric motor to linear motion of a linear motion part by use of the rotation input-output shaft; and
a housing holding the linear motion mechanism, wherein
the electric motor is provided with a stator and a rotor which are arranged such that directions of magnetic poles that generate interlinkage flux contributing to a motor torque are parallel with a rotation axis of the electric motor,
the stator is arranged so as to be coupled with an axial end surface of the housing, and
the rotor is arranged so as to have a space, in an axial direction, from a torque generating surface of the stator, and the rotor is fixed to the rotation input-output shaft of the linear motion mechanism.

According to this configuration, the electric motor is a so-called axial gap motor provided with a stator and a rotor which are arranged such that the directions of magnetic poles that generate interlinkage flux contributing to the motor torque are parallel with the rotation axis. The stator is arranged so as to be coupled with the axial end surface of the housing, and the rotor is arranged so as to have a space, in the axial direction, from the torque generating surface of the stator. This arrangement of having the electric motor and the linear motion mechanism adjacent to each other in the axial direction, can reduce an ineffective space and achieve space saving, and furthermore, achieve high torque by means of the axial gap motor.

Since the electric motor and the linear motion mechanism are arranged adjacent to each other in the axial direction, the assemblability and the versatility of the linear motion mechanism, etc., can be improved, compared to a conventional structure in which an electric motor and an actuator are arranged in parallel, for example. Since the rotor is directly fixed to the rotation input-output shaft of the linear motion mechanism, the number of components can be reduced and the structure can be simplified, compared to a structure in which a coupling mechanism such as a parallel gear is provided between an electric motor and a linear motion mechanism, for example. As a result, the production cost of the electric linear motion actuator can be reduced.

The rotor may be a magnetic field mechanism having a torque generating surface on each of both surfaces, opposite in the axial direction, of the rotor, the stator may be provided with first and second excitation mechanisms respectively arranged on both surfaces, in the axial direction, of the magnetic field mechanism, a first positioning structure configured to coaxially couple the first excitation mechanism and the axial end surface of the housing, may be provided so as to extend across the first excitation mechanism and the housing, the rotor may be fixed, to the rotation input-output shaft, at an axial position corresponding to a portion between the first excitation mechanism and the second excitation mechanism, and a second positioning structure configured to coaxially couple the first and second excitation mechanisms may be provided so as to extend across the first and second excitation mechanisms.

In this case, the stator can be formed as a so-called double stator type which is provided with the first and second excitation mechanisms respectively arranged on both surfaces, in the axial direction, of the magnetic field mechanism. The first excitation mechanism and the axially end surface of the housing are coaxially coupled via the first positioning structure. As a result, the accuracy of relative positioning of the first excitation mechanism and the housing can be improved. The first and second excitation mechanisms are coaxially coupled via the second positioning structure. As a result, the accuracy of relative positioning of the first and second excitation mechanisms can be improved. A configuration using, for example, spigot fitting for the first and second positioning structures, is inexpensive and simple, and thus is suitable.

The first and second excitation mechanisms may be fastened to the housing with a common bolt. In this case, the number of components can be reduced, and the structure is inexpensive and simple, and thus is suitable.

The stator may be an excitation mechanism having the torque generating surface on each of both surfaces, opposite in the axial direction, of the stator, the rotor may be provided with two magnetic field mechanisms that are respectively arranged on both surfaces, in the axial direction, of the excitation mechanisms, one magnetic field mechanism of the two magnetic field mechanisms may be fixed, to the rotation input-output shaft, at an axial position corresponding to a portion between the axial end surface of the housing and the torque generating surface of the excitation mechanism facing the axial end surface, and a positioning structure configured to coaxially couple the excitation mechanism and the axial end surface of the housing may be provided so as to extend across the excitation mechanism and the housing.

The aforementioned positioning structure is the same as the first positioning structure.

In this case, the rotor can be formed as a so-called double rotor type which is provided with two magnetic field mechanisms respectively arranged on both surfaces, opposite in the axial direction, of the excitation mechanism. One of the magnetic field mechanisms is fixed, to the rotation input-output shaft, at the axial position corresponding to a portion between the axial end surface of the housing and the torque generating surface of the excitation mechanism facing the axial end surface. The excitation mechanism and the axial end surface of the housing are coaxially coupled via the positioning structure. As the positioning structure, the configuration using, for example, spigot fitting is inexpensive and simple, and thus is suitable.

An electric brake device according to the present invention includes either of the aforementioned electric linear motion actuators, a brake rotor, and a friction member configured to generate a braking force by coming into contact with the brake rotor. According to this configuration, space saving and high torque can be achieved in the electric linear motion actuator. Thus, the electric brake device can be installed in a vehicle in which an installation space for the electric linear motion actuator is extremely limited. Consequently, the versatility of the electric brake device can be enhanced so that the electric brake device can be installed in various vehicles.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
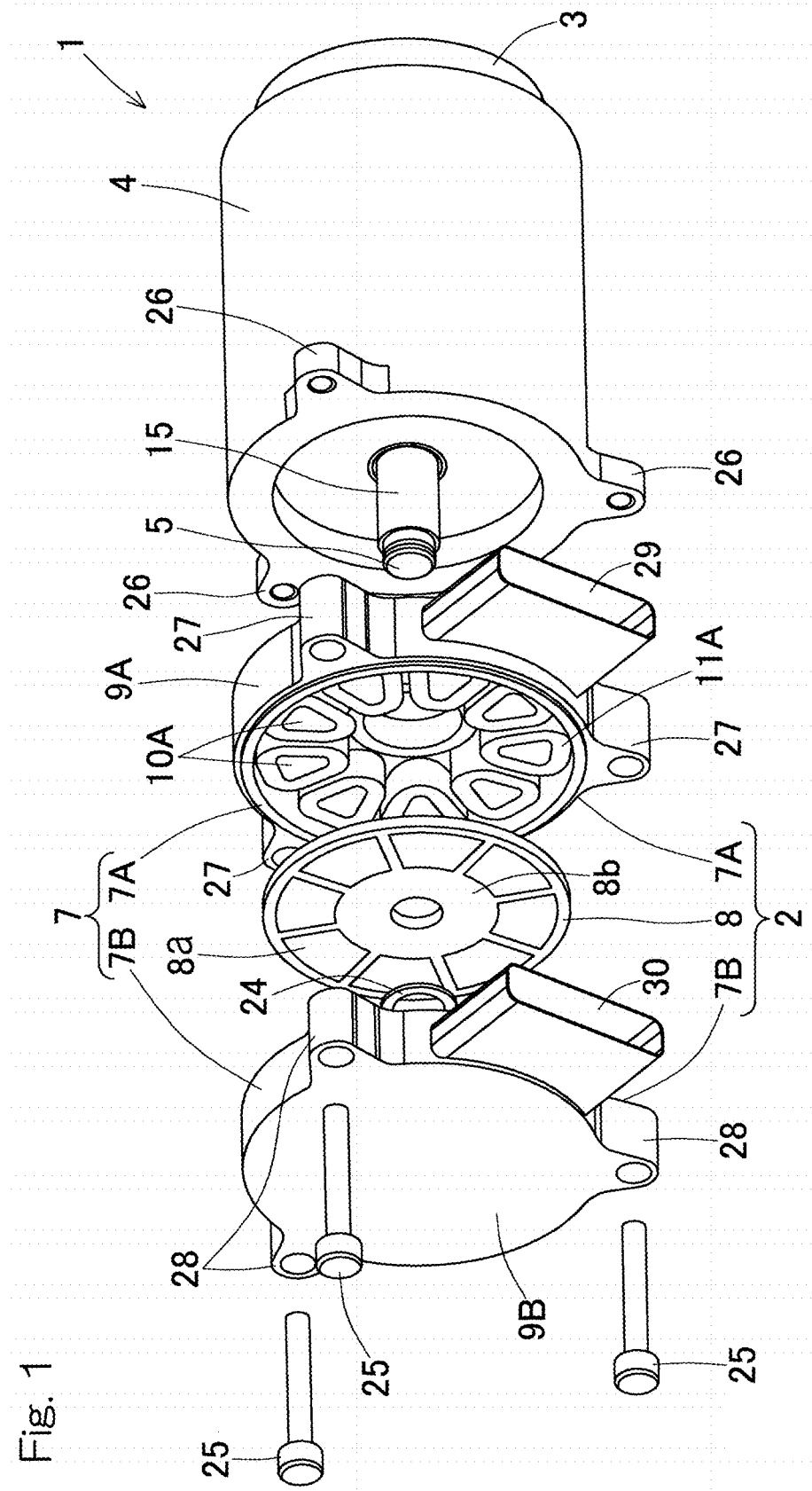
FIG. 1 is an exploded perspective view of an electric linear motion actuator according to one embodiment of the present invention.
Figure 2:
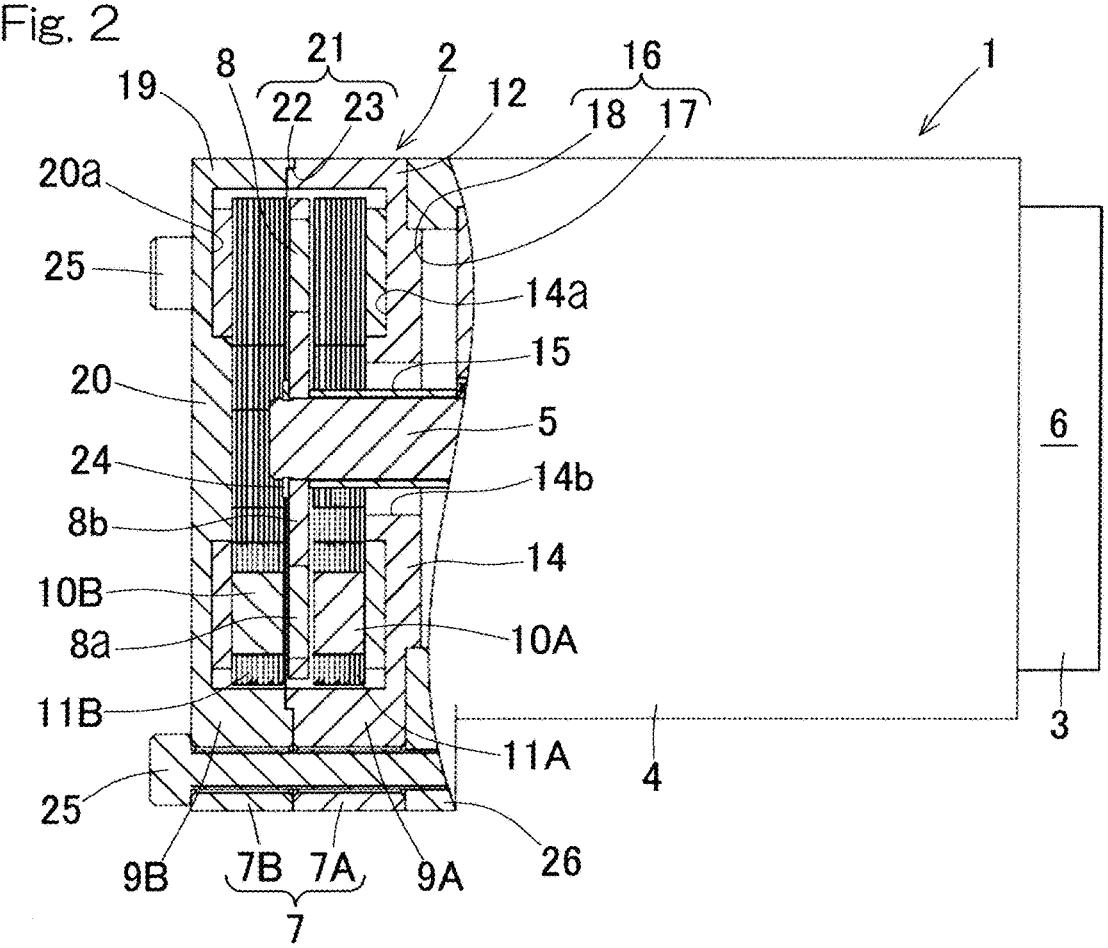
FIG. 2 is a longitudinal-sectional view showing a configuration example of an electric motor of the electric linear motion actuator.

An electric linear motion actuator according to an embodiment of the present application will be described with reference to FIG. 1 to FIG. 3. The electric linear motion actuator is installed in an electric brake device (described later) mounted in a vehicle, for example. As illustrated in FIG. 1 and FIG. 2, the electric linear motion actuator 1 is an actuator in which an electric motor 2 and a linear motion mechanism 3 are connected in series in the axial direction. The electric linear motion actuator 1 includes the electric motor 2, the linear motion mechanism 3, and a housing 4. The electric motor 2 of the present embodiment is a double stator type axial gap motor. The linear motion mechanism 3 has a linear motion part 6, and converts rotary motion of the electric motor 2 to linear motion of the linear motion part 6 via a rotation input-output shaft 5 (described later). The housing 4 holds the linear motion mechanism 3. Illustration of some components such as wiring are omitted for simplification.

The electric motor 2 will be described. The electric motor 2 is a so-called axial gap type motor provided with a stator 7 and a rotor 8 in which the stator 7 and the rotor 8 are disposed such that the directions of magnetic poles thereof, which generate interlinkage flux contributing to a motor torque, are parallel with the rotation axis of the electric motor 2. The stator 7 is held statically with respect to the housing 4. The rotor 8 is held statically with respect to the rotation input-output shaft 5 of the linear motion mechanism 3, and generates rotational torque due to interlinkage flux generated between the rotor 8 and the stator 7 which is arranged so as to have a space therefrom. The rotor 8 is a magnetic field mechanism having torque generating surfaces respectively on both surfaces, opposite to each other in the axial direction, of the rotor 8. The aforementioned term "statically" means the relationship for substantially synchronous motion, with the influence of a clearance or the like being excluded. In the present application, the term "parallel" includes not only a strictly parallel state but also a state providing the same effect as that provided by the strictly parallel state, that is, a state which can be regarded as a substantially parallel state.

The stator 7 is arranged so as to be coupled with an axial end surface, of the housing 4, on a side opposite to the direction in which the linear motion part 6 is projected toward the housing 4. The stator 7 is provided with first and second excitation mechanisms 7A, 7B which are disposed so as to respectively face both surfaces, in the axial direction, of the magnetic field mechanism. The first excitation mechanism 7A has a first stator housing 9A, magnetic body cores 10A, and coils 11A. The second excitation mechanism 7B has a second stator housing 9B, magnetic body cores 10B, and coils 11B.

In the first excitation mechanism 7A, the magnetic body cores 10A and the coils 11A are provided inside the first stator housing 9A. In the second excitation mechanism 7B, the magnetic body cores 10B and the coils 11B are provided inside the second stator housing 9B. The first and second stator housings 9A, 9B are collectively referred to as "stator housings". Each of the stator housings can be formed into a substantially cylindrical bottomed shape (described later) by using a resin member such as PPS or a metallic member such as aluminum or iron. When the resin member is used, there is an advantage in terms of cost and weight. When the metallic member is used, there is an advantage in terms of strength and improvement of noise, etc. In an alternative structure, the stator housings may be made of a resin member, and a metallic cover (not illustrated) may be separately provided to cover the stator housings made of the resin member.

The first stator housing 9A has a substantially cylindrical outer hull portion 12, and a bottom portion 14 closing an axial base end portion of the outer hull portion 12. The outer hull portion 12 and the bottom portion 14 are integrally formed into the substantially cylindrical bottomed shape. The outer hull portion 12 is formed coaxially with respect to the rotation input-output shaft 5. A stepped portion 14a having an annular shape about the axis is provided on the bottom portion 14. In the bottom portion 14, a hole 14b having a cylindrical shape extending in the axial direction is formed at a position corresponding to the rotation input-output shaft 5. In the hole 14b, the rotation input-output shaft 5 is inserted toward the inside of the first stator housing 9A. In other words, the hole 14b is formed with a predetermined radial space from the outer circumferential surface of the rotation input-output shaft 5 so as not to interfere with the rotation input-output shaft 5 and a collar 15 (described later).

In the first stator housing 9A, the magnetic body cores 10A having core portions or iron core portions each projecting to one side in the axial direction and a back yoke having a substantially disk-like shape are provided adjacent to the stepped portion 14a of the bottom portion 14. A plurality (nine in the example in FIG. 1) of the core portions of the magnetic body cores 10A are provided at fixed intervals in the circumferential direction. Each of the magnetic body cores 10A is made of a steel plate laminate or a powder magnetic core, for example. The magnetic body cores 10A are held by the first stator housing 9A by means of bolts, welding, molding, potting, bonding, fitting, or the like. The coils 11A are wound around the core portions of the respective magnetic body cores 10A. The configuration of the magnetic body cores 10A and the coils 11A is the same as that of the magnetic body cores 10B and the coils 11B in the second stator housing 9B. When the magnetic body cores 10A, 10B are used, high torque can be generated while power is saved, so that the magnetic body cores 10A, 10B are considered to be suitable. However, air core coils which are effective for reduction of the component cost and reduction of the torque variation may be used, without providing the core portions projecting in the axial direction in the magnetic body cores. A magnetic body may be used for the first stator housing 9A, so that the first stator housing also servers as a back yoke, and the magnetic body cores 10A are provided with no back yoke.

A first positioning structure 16 (FIG. 2) which coaxially couples the first stator housing 9A and an axial end surface of the housing 4 is provided. The first positioning structure 16 is provided so as to extend across the first stator housing 9A and the housing 4. In the present embodiment, the first positioning structure 16 is implemented by spigot fitting between the inner circumferential surface 17 of the housing 4 and the outer circumferential surface 18 as a stepped portion of the bottom portion 14. The tolerance, etc., of a fitting portion between the inner circumferential surface 17 of the housing 4 and the outer circumferential surface 18 of the bottom portion 14 are determined, as appropriate, according to the assembly work procedure, etc. For example, a bolt fixation portion for temporarily fixing the fitting portion may be separately provided.

The second stator housing 9B has an outer hull portion 19 having a substantially cylindrical shape, and a bottom portion 20 covering an axial base end portion of the outer hull portion 19. The outer hull portion 19 and the bottom portion 20 are integrally formed into the substantially cylindrical bottomed shape. The outer hull portion 19 is formed coaxially with respect to the rotation input-output shaft 5. The magnetic body cores 10B and the coils 11B provided inside the second stator housing 9B are configured so as not to interfere with the leading end of the rotation input-output shaft 5. In the second stator housing 9B, a stepped portion 20a having an annular shape about the axis is provided on the bottom portion 20. The magnetic body cores 10B provided with core portions or iron core portions each projecting to one side in the axial direction and a back yoke having a substantially disk-like shape are provided adjacent to the stepped portion 20a of the bottom portion 20.

A second positioning structure 21 that coaxially couples the first and second stator housings 9A, 9B is provided. The second positioning structure 21 is provided so as to extend across the first and second stator housings 9A, 9B. In the present embodiment, the second positioning structure 21 is implemented by spigot fitting between an outer circumferential surface 22 as a stepped portion of the first stator housing 9A and an inner circumferential surface 23 as a stepped portion of the second stator housing 9B. The stepped portion of the first stator housing 9A is formed on the axial leading end portion of the outer hull portion 12 of the first stator housing 9A. The stepped portion of the second stator housing 9B is formed on the axial leading end portion of the outer hull portion 19 of the second stator housing 9B.

The rotor 8 is a disc-like member having permanent magnets 8a and a holding portion 8b holding the permanent magnets 8a, for example. The holding portion 8b is made from a non-magnetic material such as resin or stainless steel, for example. The stator 7 is configured as an excitation mechanism including a plurality of the coils 11A, 11B, the rotor 8 is configured as a magnetic field mechanism using the permanent magnets 8a, and the electric motor 2 is a permanent-magnet synchronous electric motor, as described above. Then, this configuration is excellent in the durability, the torque density, etc., and is considered to be suitable as an electric linear motion actuator.

The rotor 8 is fixed to the leading end portion of the rotation input-output shaft 5 of the linear motion mechanism 3. In the present embodiment, the cylindrical collar 15 (FIG. 1) is fitted to an outer circumferential surface, of the rotation input-output shaft 5, projected from the housing 4 in the axial direction. In the leading end portion of the rotation input-output shaft 5, an annular groove for fixing a retaining ring 24 is formed. On the outer circumferential surface of the rotation input-output shaft 5, the rotor 8 is axially positioned and fixed between an axially leading end surface of the collar 15 and the retaining ring 24 (FIG. 2).

Consequently, through the collar 15 and the retaining ring 24, the rotor 8 is fixed, to the rotation input-output shaft 5, at an axial position corresponding to a position between the first excitation mechanism 7A and the second excitation mechanism 7B. A rotation-axis circumferential positioning structure (illustration of which is omitted) for allowing transmission of torque from the rotor 8 to the rotation input-output shaft 5, can be realized by surface processing, splining, a fitting friction force, welding, or the like.

The first and second stator housings 9A, 9B are fastened to the housing 4 with common bolts 25 (FIG. 1). A plurality of (three in the present embodiment) flange portions 26 each projecting radially outward by a predetermined length are provided, on the outer circumferential surface, of the housing 4, on an axial end surface side facing the first stator housing 9A, so as to be arranged at circumferentially equal intervals. Female screws are formed in the respective flange portions 26, and the bolts 25 can be screwed in the female screws.

A plurality of flanges 27 and a plurality of flanges 28, the phases of which match those of the plurality of flange portions 26, are formed on the outer hull portions 12, 19 of the first and second stator housings 9A, 9B, respectively. A through hole into which the bolt 25 is inserted is formed in each of the flanges 27, 28. Consequently, in the state where the first and second stator housings 9A, 9B are temporarily fixed to the housing 4, the bolts 25 are inserted into the respective through holes of the flanges 28 of the second stator housing 9B and into the respective through holes of the flanges 27 of the first stator housing 9A, and are screwed in the respective female screws in the flange portions 26 of the housing 4.

As electrical connections of the coils 11A, 11B in the stator 7, connectors 29, 30 each projecting radially outward are formed on the outer hull portions 12, 19 of the first and second stator housings 9A, 9B, respectively. A control device (not illustrated) for controlling the electric motor 2 is electrically connected to the first and second excitation mechanisms 7A, 7B via the connectors 29, 30.

The housing 4 and the linear motion mechanism 3 will be described. As illustrated in FIG. 3, the linear motion mechanism 3 is incorporated in the cylindrical housing 4. The linear motion mechanism 3 loads a braking force to a brake rotor (described later) by an output from the electric motor 2 (FIG. 2). The linear motion mechanism 3 converts the rotary motion of the electric motor 2 to linear motion of the linear motion part 6 via the rotation input-output shaft 5.

Figure 3:
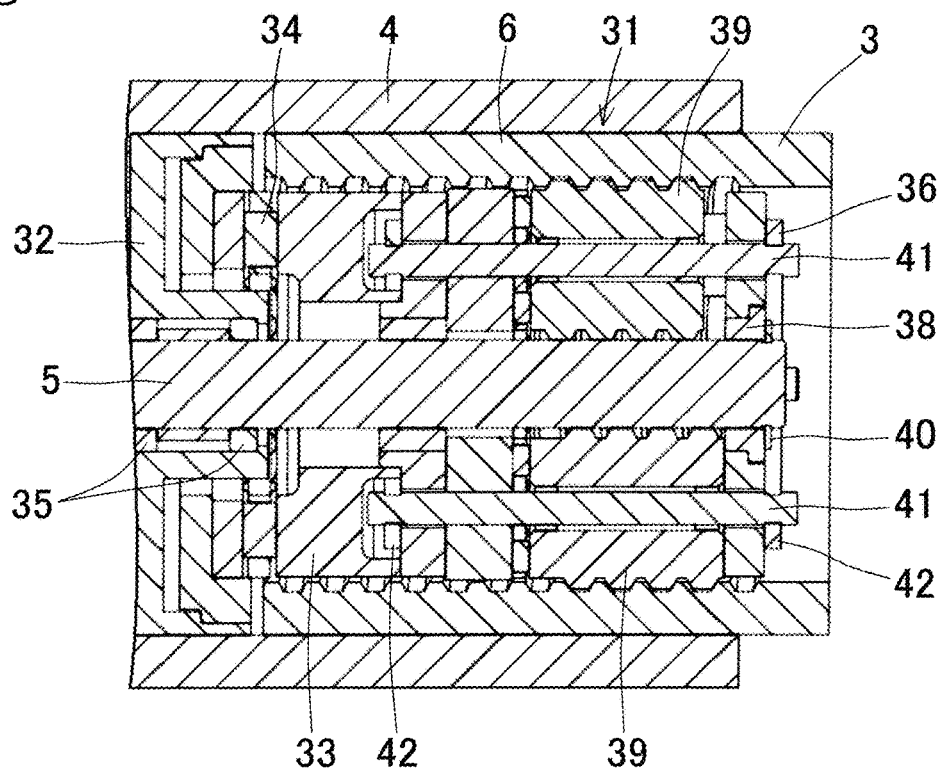
FIG. 3 is a longitudinal-sectional view showing a configuration example of a linear motion mechanism, etc., of the electric linear motion actuator.

The linear motion mechanism 3 in FIG. 3 has the rotation input-output shaft 5 that is rotationally driven by the electric motor 2, and a conversion mechanism part 31 that converts rotary motion of the rotation input-output shaft 5 to the linear motion. The present embodiment exemplifies a case where the conversion mechanism part 31 is formed so as to have a planetary-roller screw structure. The conversion mechanism part 31 has the linear motion part 6, a support member 32, a back plate 33 which is an annular thrust plate, a thrust bearing 34, radial bearings 35, a carrier 36, sliding bearings 37, 38, and planetary rollers 39.

The linear motion part 6 having a cylindrical shape is locked so as not to rotate and is supported in an axially movable manner on the inner circumferential surface of the housing 4. Spiral projections each formed into a spiral shape projecting radially inward are provided on the inner circumferential surface of the linear motion part 6. A plurality of the planetary rollers 39 are engaged with the spiral projections.

The support member 32 is provided on one axial end side of the linear motion part 6 in the housing 4. The support member 32 has a cylindrical boss portion and a flange portion extending radially outward from the boss portion. A plurality of the radial bearings 35 are fitted in the boss portion, and the rotation input-output shaft 5 is fitted to the inner diameter surfaces of inner rings of the radial bearings 35. The rotation input-output shaft 5 is supported by the support member 32 in a rotatable manner via the plurality of radial bearings 35.

The carrier 36 rotatable about the rotation input-output shaft 5 is provided on the inner circumference of the linear motion part 6. The carrier 36 is supported, in a rotatable manner, by the rotation input-output shaft 5 through the sliding bearings 37, 38 fitted between the carrier 36 and the rotation input-output shaft 5. A retaining ring 40 for retaining the axial position of the rotation input-output shaft 5 and the axial position of the carrier 36 relative to the support member 32 is provided on the axial leading end portion of the rotation input-output shaft 5.

To the carrier 36, a plurality of roller shafts 41 are provided spaced apart from each other in the circumferential direction. A plurality of shaft insertion holes are formed in each of opposite ends, in the axial direction, of the carrier 36. Each of the shaft insertion holes is formed as an oblong hole extending in the radial direction by a predetermined length. Both axial ends of each of the roller shafts 41 are inserted in the corresponding shaft insertion holes so that the roller shafts 41 are supported so as to be movable in the radial direction within the ranges of the corresponding shaft insertion holes. An elastic ring 42 which urges the roller shafts 41 radially inward is extended over each of both axial ends of the plurality of roller shafts 41.

Figure 6:
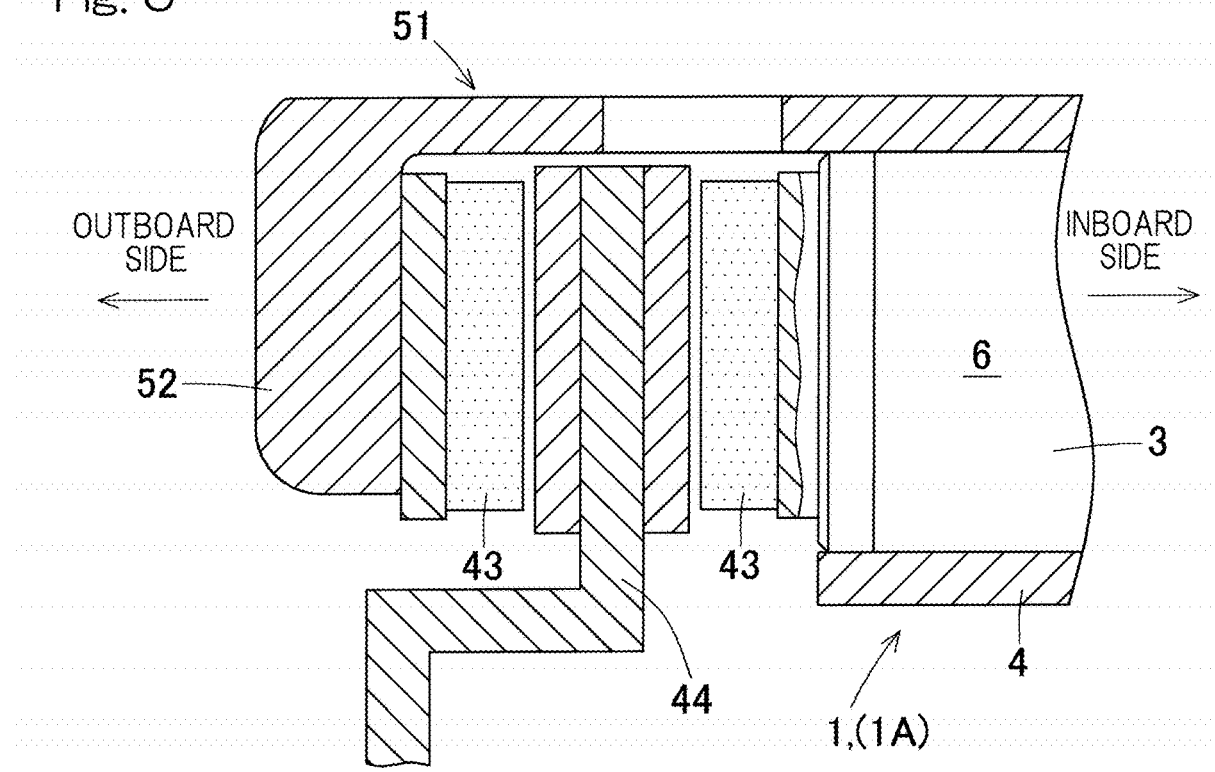
FIG. 6 is a partial longitudinal-sectional view of an electric brake device provided with either of the electric linear motion actuators.

The planetary rollers 39 are rotatably supported by the respective roller shafts 41. Circumferential grooves or threaded grooves which are engaged with spiral projections on the linear motion part 6 are formed in the outer circumferential surfaces of the planetary rollers 39. The planetary rollers 39 are interposed between the outer circumferential surface of the rotation input-output shaft 5 and the inner circumferential surface of the linear motion part 6. By an urging force of the elastic ring 42, the planetary rollers 39 are pressed against the outer circumferential surface of the rotation input-output shaft 5. By rotation of the rotation input-output shaft 5 by the electric motor 2 (FIG. 2), the planetary rollers 39 (FIG. 3) in contact with the outer circumferential surface of the rotation input-output shaft 5 rotate due to contact friction. Accordingly, the linear motion part 6 moves in the axial direction so that the friction pad 43 (FIG. 6) provided at the axial leading end of the linear motion part 6 abuts on and separates from the brake rotor 44 (FIG. 6).

According to the electric linear motion actuator 1 described above, the stator 7 is arranged so as to be coupled with the axial end surface, of the housing 4, on a side opposite to the direction in which the linear motion part 6 is projected toward the housing 4, and further, the rotor 8 is arranged so as to have a space, in the axial direction, from the torque generating surface of the stator 7. Since the electric motor 2 and the linear motion mechanism 3 are arranged adjacent to each other in the axial direction, an ineffective space is reduced so that space saving can be achieved. Furthermore, high torque can be attained by the axial gap motor.

The electric motor 2 and the linear motion mechanism 3 are arranged adjacent to each other in the axial direction. Therefore, the assemblability and the versatility of the linear motion mechanism, etc., can be improved, compared to a conventional structure in which an electric motor and an actuator are arranged in parallel with each other, for example. The rotor 8 is directly fixed to the rotation input-output shaft 5 of the linear motion mechanism 3. Therefore, the number of components can be reduced and the structure can be simplified, compared to a structure in which a coupling mechanism such as a parallel gear is provided between an electric motor and a linear motion mechanism, for example. Thus, the production cost of the electric linear motion actuator 1 can be reduced.

The first excitation mechanism 7A and the axial end surface of the housing 4 are coaxially coupled with each other via the first positioning structure 16. Accordingly, the accuracy of relative positioning of the first excitation mechanism 7A and the housing 4 can be improved. The first and second excitation mechanisms 7A, 7B are coaxially coupled with each other via the second positioning structure 21. Accordingly, the accuracy of relative positioning of the first and second excitation mechanisms 7A, 7B can be improved. The first and second positioning structures 16, 21 are implemented by spigot fitting, so that the configuration is inexpensive and simple and thus is suitable. Since the first and second excitation mechanisms 7A, 7B are fastened to the housing 4 with the common bolts 25, the number of components can be reduced, so that the structure is inexpensive and simple and thus is suitable.

Other embodiments will be described. In the following description, in each embodiment, portions corresponding to the matters described in the preceding embodiments are designated by the same reference numerals, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Figure 4:
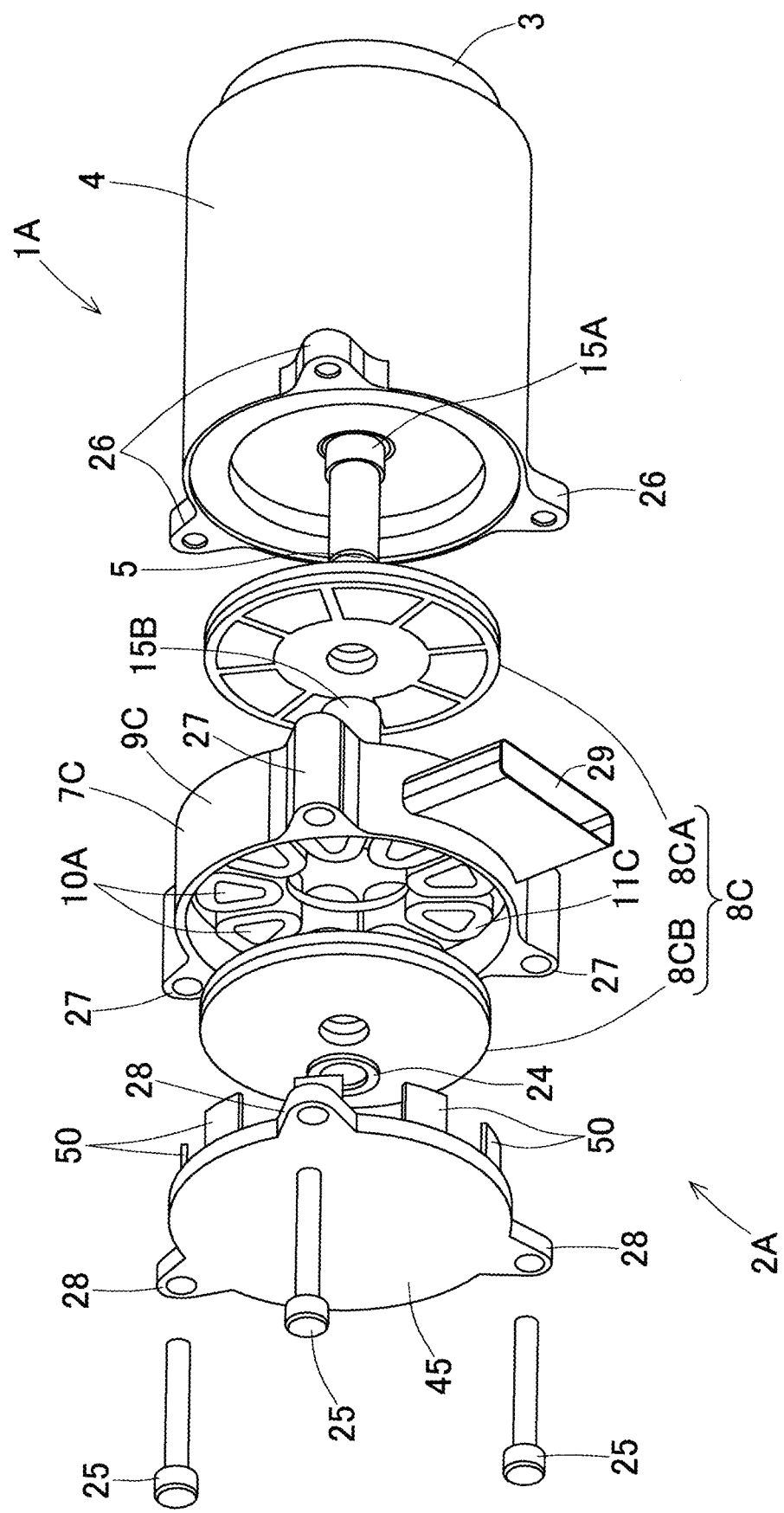
FIG. 4 is an exploded perspective view of an electric linear motion actuator according to another embodiment of the present invention.
Figure 5:
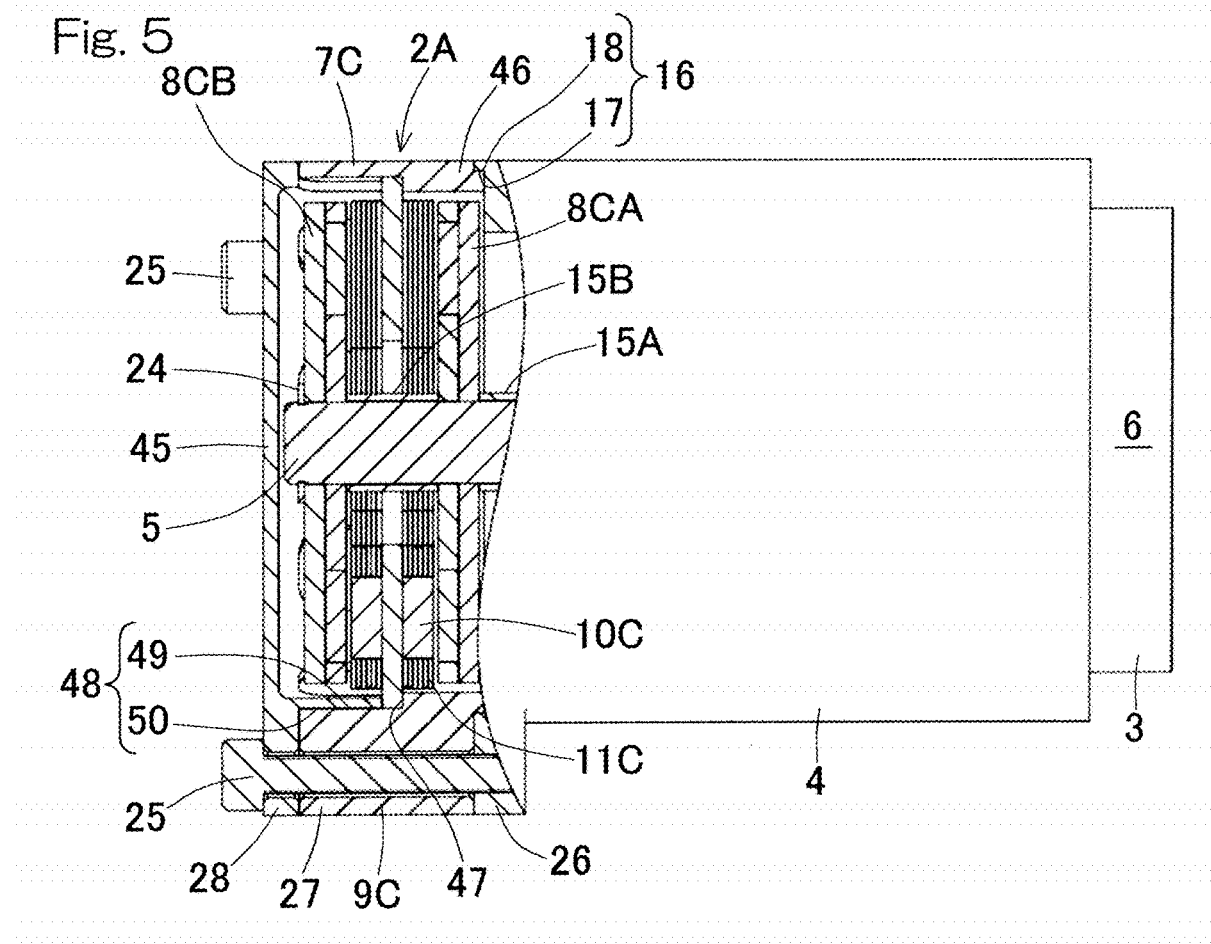
FIG. 5 is a longitudinal-sectional view showing a configuration example of an electric motor of the electric linear motion actuator.

As illustrated in FIG. 4 and FIG. 5, an electric motor 2A of an electric linear motion actuator 1A is a double rotor type axial gap motor. The electric motor 2A has a stator 7C, a rotor 8C, and a motor cover 45. The stator 7C is an excitation mechanism having torque generating surfaces on both surfaces, in the axial direction, of the stator 7C. The rotor 8C is provided with two magnetic field mechanisms 8CA, 8CB arranged on both surfaces, in the axial direction, of the excitation mechanism so as to face each other (FIG. 4).

On an axial end surface, of the housing 4, on a side opposite to the direction in which the linear motion part 6 is projected toward the housing 4, the stator 7C and the motor cover 45 are arranged so as to be coupled with each other. The stator 7C has a stator housing 9C, magnetic body cores 10C, and coils 11C. In the stator housing 9C, the magnetic body cores 10C and the coils 11C are provided.

The stator housing 9C is provided with an outer hull portion 46 having a substantially cylindrical shape. The outer hull portion 46 has a substantially cylindrical shape, opposite ends of which, in the axial direction, are open. A stepped portion 47 for axially positioning the magnetic body cores 10C is provided around an axially middle portion on the inner circumferential surface of the outer hull portion 46. In the state where the axial positions of the magnetic body cores 10C are positioned at the stepped portion 47 of the outer hull portion 46, the magnetic body cores 10C are fitted and fixed to the inner circumferential surface of the outer hull portion 46. As a mechanism for positioning the magnetic body cores 10C in the circumferential direction with respect to the outer hull portion 46, a flat surface portion, a key groove portion, or the like is provided, for example.

Of the two magnetic field mechanisms 8CA, 8CB, the magnetic field mechanism 8CA (referred to as "first magnetic field mechanism 8CA") is fixed, to the rotation input-output shaft 5, at an axial position between an axial end surface of the housing 4 and a torque generating surface of an excitation mechanism facing the axial end surface. In the present embodiment, first and second collars 15A, 15B and the retaining ring 24 are sequentially fitted, in the axial direction, to the outer circumferential surface of the rotation input-output shaft 5, projecting from the housing 4 toward the axial direction. On the outer circumferential surface of the rotation input-output shaft 5, the first magnetic field mechanism 8CA is positioned and fixed in the axial direction between the first collar 15A and the second collar 15B.

On the outer circumferential surface of the rotation input-output shaft 5, the other second magnetic field mechanism 8CB of the two magnetic field mechanisms is axially positioned and fixed between the second collar 15B and the retaining ring 24. The rotation-axis circumferential positioning structure for allowing transmission of torque from the first and second magnetic field mechanisms 8CA, 8CB to the rotation input-output shaft 5 can be realized by surface processing, splining, fitting friction force, welding, or the like, as in the aforementioned embodiment. As illustrated in FIG. 5, a positioning structure 48 for coaxially coupling the stator housing 9C and the motor cover 45 is provided.

In the present embodiment, the positioning structure 48 is implemented by spigot fitting between an inner circumferential surface 49 serving as a stepped portion of the stator housing 9C and outer circumferential surfaces 50 of the motor cover 45. A plurality of the outer circumferential surfaces 50 of the motor cover 45 are provided at fixed intervals in the circumferential direction (FIG. 4).

The stator housing 9C and the motor cover 45 are fastened to the housing 4 with the common bolts 25. The plurality of flanges 27, 28, the phases of which match those of the plurality of flange portions 26 of the housing 4, are formed on the outer peripheral portions of the stator housing 9C and the motor cover 45, respectively. Through holes through which the bolts 25 are inserted are formed in the flanges 27, 28.

According to this configuration, since the electric motor 2A and the linear motion mechanism 3 are arranged adjacent to each other in the axial direction, an ineffective space is reduced so that space saving can be achieved. Furthermore, high torque can be attained by the axial gap motor. In addition, the same advantages as those by the aforementioned embodiment are obtained.

FIG. 6 is a partial longitudinal-sectional view of an electric brake device provided with either the electric linear motion actuator 1 or 1A. The electric brake device is basically provided with the electric linear motion actuator 1, (1A), a brake rotor 44 which is a rotary member that rotates integrally with a wheel, and a friction pad (friction member) 43 that generates a braking force by coming into contact with the brake rotor 44, and is further provided with a control device (not illustrated) that controls the electric linear motion actuator. In the vehicle, a caliper 51 is provided so as to surround the outer circumferential side portion of the brake rotor 44. The caliper 51 is provided integrally with the housing 4 of the electric linear motion actuator 1, (1A).

A claw portion 52 is provided on an outboard side end of the caliper 51. The claw portion 52 faces, in the axial direction, an outboard side lateral surface of the rotor 44. The friction pad 43 on the outboard side is supported by the claw portion 52. With the electric brake device being installed in the vehicle, the outer side in the vehicle width direction is referred to as the outboard side, and the center side in the vehicle width direction is referred to as an inboard side.

The friction pad 43 on the inboard side is supported by the outboard side end of the linear motion part 6 of the linear motion mechanism 3, of the caliper 51. The friction pad 43 faces, in the axial direction, an inboard-side lateral surface of the brake rotor 44. The electric linear motion actuator 1, (1A) performs driving to cause the friction pads 43 to abut on or separate from the brake rotor 44.

A mount (not illustrated) is supported by a knuckle (not illustrated) of a vehicle. A pair of pin support pieces (not illustrated) are provided on opposite ends, in the longitudinal direction, of the mount. A sliding pin (not illustrated) extending in parallel with the axial direction is provided to an end of each of the pin support pieces. The caliper 51 is supported in an axially slidable manner by the sliding pins.

The control device controls rotation of the electric motor of the electric linear motion actuator 1, (1A) according to the operation amount of a brake pedal (not illustrated). During braking, driving by the electric linear motion actuator 1, (1A) causes the friction pad 43 on the in-board side to abut on the brake rotor 44 and press the brake rotor 44 in the axial direction. The caliper 51 slides toward the inboard side with the reaction force of the pressing force. Accordingly, the friction pad 43, on the outboard side, supported by the claw portion 52 of the caliper 51 comes into contact with the brake rotor 44. The friction pads 43, 43 on the outboard side and the inboard side firmly sandwich the brake rotor 44 from both sides in the axial direction so that a braking force is loaded to the brake rotor 44.

According to this configuration, space saving and high torque can be achieved in the electric linear motion actuator 1, (1A). Therefore, the electric brake device can be installed even in a vehicle in which an installation space for the electric linear motion actuator 1, (1A) is extremely limited. Consequently, the versatility of the electric brake device can be enhanced so that the electric brake device can be installed in various vehicles.

The rotor is axially positioned and fixed with respect to the rotation input-output shaft by use of the collar and the restraining ring, but the present application is not limited to this embodiment. For example, instead of the collar, another restraining ring and a restraining groove may be used, or a stepped rotation input-output shaft, the outer diameter of which changes at a prescribed position in the axial direction, may be used, to position the rotor in the axial direction. Apart from that, welding, shrinkage fitting, or the like may be used. Alternatively, a screw portion may be provided at a prescribed position to position the rotor in the axial direction.

The first and second stator housings are fastened to the housing with common bolts. However, the first and second stator housings may have, at different positions, respective fixation structures fastenable to the housing. Alternatively, the first and second stator housings may be fixed to the housing by welding, bonding, or the like.

The rotor, in which a holding portion made from a non-magnetic material holds permanent magnets, is considered to be suitable because the loss is small. However, a holding portion made from a magnetic material also can hold the permanent magnets. The rotor may, without using any holding portion, have a structure in which a single magnet magnetized to a plurality of axial magnetic poles is directly fixed to the rotation input-output shaft.

For example, the electric motor may adopt a DC motor configuration in which permanent magnets are used for a stator, and coils and brushes, etc., are used for a rotor. Alternatively, the electric motor may adopt a reluctance motor configuration using a core, or an iron core, having a shape which causes the stator inductance to change with rotation of a rotor.

The first and second stator housings each have a shape provided with a connector. However, the first and second stator housings are not limited to this shape. For example, a structure for integrating connectors may be adopted in which wiring in either one of the first and second stator housings is led out with use of a bus bar (not illustrated) or the like in the rotation axial direction, and, when the other stator housing is fixed to the one stator housing, wire connection is performed on a predetermined connection.

As the electric connection to the stator, prescribed wiring connection may be made with use of a bus bar, a coil material, a harness, or the like (not illustrated). For example, when a structure is adopted in which a stator housing is formed of a resin member and a bus bar is formed in the stator housing through insert molding, there is an advantage in terms of space saving. Meanwhile, when a structure using the coil material or the harness is adopted, there is an advantage in terms of cost because yield is high. These structures may be selected, as appropriate, according to the requirement.

As the conversion mechanism unit of the linear motion mechanism, various screw mechanisms such as a ball screw, a mechanism using a slope such as a ball ramp, or the like may be adopted other than the planetary rollers. Furthermore, various sensors or the like such as an angular sensor and a thermistor may be provided as appropriate on the basis of the application conditions for the electric linear motor actuator.

The preferred embodiments have been described above with reference to the accompanying drawings. However, various additions, modification, and deletions can be made within the gist of the present invention. Accordingly, such additions, modification, and deletions are also included in the scope of the present invention.

REFERENCE NUMERALS 1, 1A . . . electric linear motion actuator
2, 2A . . . electric motor
3 . . . linear motion mechanism
4 . . . housing
5 . . . rotation input-output shaft
6 . . . linear motion part
7, 7C . . . stator
7A, 7B . . . first, second excitation mechanism
8, 8C . . . stator
8CA, 8CB . . . magnetic field mechanism
16 . . . first positioning structure
21 . . . second positioning structure
25 . . . bolt
43 . . . friction pad (friction member)
44 . . . brake rotor

What is claimed is:

1. An electric linear motion actuator comprising:
an electric motor;
a linear motion mechanism having a rotation input-output shaft and being configured to convert rotary motion of the electric motor to linear motion of a linear motion part by use of the rotation input-output shaft; and
a main housing holding the linear motion mechanism, wherein
the electric motor is provided with a stator and a rotor, wherein the stator and the rotor are arranged such that directions of magnetic poles that generate interlinkage flux contributing to a motor torque are parallel with a rotation axis of the electric motor,
the stator is arranged so as to be coupled with an axial end surface of the main housing,
the rotor is arranged so as to have a space, in an axial direction, from a torque generating surface of the stator, and the rotor is fixed to the rotation input-output shaft of the linear motion mechanism,
a first positioning structure, configured to coaxially couple the stator and the axial end surface of the main housing, provided so as to extend across the stator and the main housing, and
the first positioning structure is implemented by fitting between an inner circumferential surface of one of a first housing of the stator and the main housing and an outer circumferential surface of the other of the first housing of the stator and the main housing.

2. The electric linear motion actuator as claimed in claim 1, wherein
the rotor is a magnetic field mechanism having a torque generating surface on each of both surfaces, opposite in the axial direction, of the rotor,
the stator is provided with first and second excitation mechanisms respectively arranged on both surfaces, in the axial direction, of the magnetic field mechanism,
the first positioning structure is configured to coaxially couple the first excitation mechanism and the axial end surface of the main housing, and is provided so as to extend across the first excitation mechanism and the main housing,
the rotor is fixed, to the rotation input-output shaft, at an axial position corresponding to a portion between the first excitation mechanism and the second excitation mechanism,
a second positioning structure configured to coaxially couple the first and second excitation mechanisms is provided so as to extend across the first and second excitation mechanisms, and
the second positioning structure is implemented b fitting between an inner circumferential surface of one of the first housing of the first excitation mechanism and a second housing of the second excitation mechanism and an outer circumferential surface of the other of the first housing of the first excitation mechanism and the second housing of the second excitation mechanism.

3. The electric linear motion actuator as claimed in claim 1, wherein
the stator is a third excitation mechanism having the torque generating surface on each of both surfaces, opposite in the axial direction, of the stator,
the rotor is provided with two magnetic field mechanisms that are respectively arranged on both surfaces, opposite in the axial direction, of the third excitation mechanism, and
one magnetic field mechanism of the two magnetic field mechanisms is fixed, to the rotation input-output shaft, at an axial position corresponding to a portion between the axial end surface of the main housing and the torque generating surface of the third excitation mechanism facing the axial end surface.

4. The electric linear motion actuator as claimed in claim 3, wherein
a third positioning structure is implemented by fitting between an inner circumferential surface of one of a third housing of the third excitation mechanism and a motor cover and an outer circumferential surface of the other of the third housing of the third excitation mechanism and the motor cover.

5. An electric brake device comprising:
the electric linear motion actuator as claimed in claim 1;
a brake rotor; and
a friction member configured to generate a braking force by coming into contact with the brake rotor.

6. The electric linear motion actuator as claimed in claim 2, wherein the first and second excitation mechanisms are fastened to the main housing with common bolts, or the first excitation mechanism and the main housing are coupled with each other.

7. The electric linear motion actuator as claimed in claim 3, wherein the third excitation mechanism and the main housing are coupled with each other.

\* \* \* \* \*